(12) United States Patent
Cong et al.

(10) Patent No.: US 11,003,584 B2
(45) Date of Patent: May 11, 2021

(54) TECHNOLOGY FOR MANAGING MEMORY TAGS

(71) Applicant: Intel Corporation, Santa Clara, CA (US)

(72) Inventors: Kai Cong, Hillsboro, OR (US); Karanvir Grewal, Hillsboro, OR (US); Siddhartha Chhabra, Portland, OR (US); Sergej Deutsch, Hillsboro, OR (US); David Michael Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/288,844

(22) Filed: Feb. 28, 2019

(65) Prior Publication Data

US 2019/0196977 A1 Jun. 27, 2019

(51) Int. Cl.
*G06F 12/10* (2016.01)
*G06F 21/60* (2013.01)
(Continued)

(52) U.S. Cl.
CPC ............ *G06F 12/10* (2013.01); *G06F 3/0604* (2013.01); *G06F 3/065* (2013.01); *G06F 3/0673* (2013.01); *G06F 11/1076* (2013.01); *G06F 12/0802* (2013.01); *G06F 12/1408* (2013.01); *G06F 12/1475* (2013.01); *G06F 21/602* (2013.01);
(Continued)

(58) Field of Classification Search
CPC ................................ G06F 12/08; G06F 12/145
See application file for complete search history.

(56) References Cited

U.S. PATENT DOCUMENTS

| 4,922,414 A | * | 5/1990 | Holloway | ............... G06F 8/312 711/207 |
| 5,335,334 A | * | 8/1994 | Takahashi | ........... G06F 12/1441 235/382 |

(Continued)

OTHER PUBLICATIONS

Piromsopa et al. "Secure Bit: Transparent, Hardware Buffer-Overflow Protection." Nov. 2006. IEEE. IEEE Transactions on Dependable and Secure Computing. vol. 3. pp. 365-376.*

(Continued)

*Primary Examiner* — Nathan Sadler
(74) *Attorney, Agent, or Firm* — Trop Pruner & Hu, P.C.

(57) ABSTRACT

A data processing system includes support for sub-page granular memory tags. The data processing system comprises at least one core, a memory controller responsive to the core, random access memory (RAM) responsive to the memory controller, and a memory protection module in the memory controller. The memory protection module enables the memory controller to use a memory tag value supplied as part of a memory address to protect data stored at a location that is based on a location value supplied as another part of the memory address. The data processing system also comprises an operating system (OS) which, when executed in the data processing system, manages swapping a page of data out of the RAM to non-volatile storage (NVS) by using a memory tag map (MTM) to apply memory tags to respective subpages within the page being swapped out. Other embodiments are described and claimed.

20 Claims, 6 Drawing Sheets

(51) Int. Cl.

| | | |
|---|---|---|
| *G06F 21/78* | (2013.01) | |
| *G06F 12/14* | (2006.01) | |
| *G06F 12/0802* | (2016.01) | |
| *G06F 11/10* | (2006.01) | |
| *G06F 3/06* | (2006.01) | |

(52) U.S. Cl.
CPC ...... *G06F 21/78* (2013.01); *G06F 2212/1052* (2013.01); *G06F 2212/402* (2013.01); *G06F 2212/657* (2013.01)

(56) References Cited

U.S. PATENT DOCUMENTS

| | | | |
|---|---|---|---|
| 9,990,249 B2 | 6/2018 | Durham et al. | |
| 2006/0047972 A1* | 3/2006 | Morais ................ | G06F 12/1408 713/190 |
| 2016/0110298 A1 | 4/2016 | Koufaty et al. | |
| 2016/0283409 A1* | 9/2016 | Pandey ................ | G06F 21/57 |
| 2017/0083724 A1* | 3/2017 | Chhabra ................ | G06F 21/72 |
| 2017/0185532 A1* | 6/2017 | Durham ............... | G06F 11/1004 |
| 2017/0285976 A1 | 10/2017 | Durham et al. | |
| 2018/0091308 A1 | 3/2018 | Durham et al. | |
| 2018/0095899 A1 | 4/2018 | Durham et al. | |
| 2018/0181337 A1 | 6/2018 | Durham et al. | |
| 2018/0365451 A1* | 12/2018 | Ndu ...................... | G06F 21/602 |
| 2019/0042324 A1 | 2/2019 | Chhabra et al. | |
| 2019/0042359 A1 | 2/2019 | Durham et al. | |
| 2019/0042402 A1 | 2/2019 | Chhabra et al. | |
| 2019/0042799 A1* | 2/2019 | Durham ............... | G06F 21/64 |
| 2019/0043600 A1* | 2/2019 | Saileshwar ........... | H04L 9/3242 |
| 2019/0108130 A1* | 4/2019 | Durham ............... | G06F 12/0895 |
| 2019/0227951 A1* | 7/2019 | Durham ................ | G06F 21/577 |

OTHER PUBLICATIONS

Cesati et al. Understanding the Linux Kernel. Oct. 2000. O'Reily. Section 7.4.*
"Intel® Architecture Memory Encryption Technologies Specification", Rev: 1.1, Dec. 2017, 30 pages, Intel Corporation.
Drepper, "What every programmer should know about memory, Part 1", Sep. 21, 2017, 39 pages, https://lwn.net/Articles/250967/.
Drepper, "Memory part 2: CPU caches", Oct. 1, 2017, 62 pages, https://lwn.net/Articles/252125/.
Drepper, "Memory part 3: Virtual Memory", Oct. 9, 2007, 13 pages, https://lwn.net/Articles/253361/.
"Page (computer memory)", Oct. 18, 2018, 5 pages, https://en.wikipedia.org/wiki/Page_(computer_memory).
Gretton-Dann, "Processors; Processors blog; Arm A-Profile Architecture Developments 2018: Armv8.5-A" Sep. 17, 2018; https://community.arm.com/processors/b/blog/posts/arm-a-protile-architecture-2018-developments-armv85a.
U.S. Appl. No. 16/205,508, filed Nov. 30, 2018, entitled "System, Apparatus and Method for Multi-Cacheline Small Object Memory Tagging" by David M. Durham, et al.
European Patent Office, European Search Report dated Jul. 31, 2020 in European patent application No. 20 15 3932, 8 pages total.

* cited by examiner

US 11,003,584 B2

TECHNOLOGY FOR MANAGING MEMORY TAGS

TECHNICAL FIELD

The present disclosure pertains in general to data processing systems and in particular to technology for managing computer memory.

BACKGROUND

A typical data processing system includes random access memory (RAM) of a certain size. However, by using so-called "virtual memory", an operating system (OS) in the data processing system may provide an apparent or virtual memory space that is larger than the actual physical memory.

A conventional OS organizes virtual memory on the basis of fixed-size blocks known as "pages," and the OS uses page tables to map the virtual memory addresses to physical memory addresses. Accordingly, virtual memory allows different applications to use the same virtual address to access different physical addresses. The OS may also swap data from RAM out to a disk (or other mass storage device) when that data has not been accessed lately and the memory space is needed for other data. When the OS swaps data from RAM out to disk, it swaps out a complete page of data at a time.

In December of 2017, Intel Corporation published a document entitled "Intel® Architecture Memory Encryption Technologies Specification," Ref: #336907-001US, Rev: 1.1 (hereinafter the "MET Specification"). The MET Specification discuss "Total Memory Encryption" (TME), which is "a base line capability for memory encryption with a single ephemeral key." The MET Specification also discuss "Multi-Key Total Memory Encryption" (MKTME), which "builds on TME and adds support for multiple encryption keys." Accordingly, MKTME involves "multiple keys for page granular memory encryption." MKTME also involves "additional support for software provisioned keys."

With MKTME, a data processing system may use different keys to encrypt different pages of memory. Thus, compared to TME, MKTME provides for memory protection on a more granular or finely detailed basis, in that different memory pages may be protected with different keys, rather than having all pages protected with a single key.

The present disclosure involves technology for providing memory protection on a more granular basis than MKTME.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
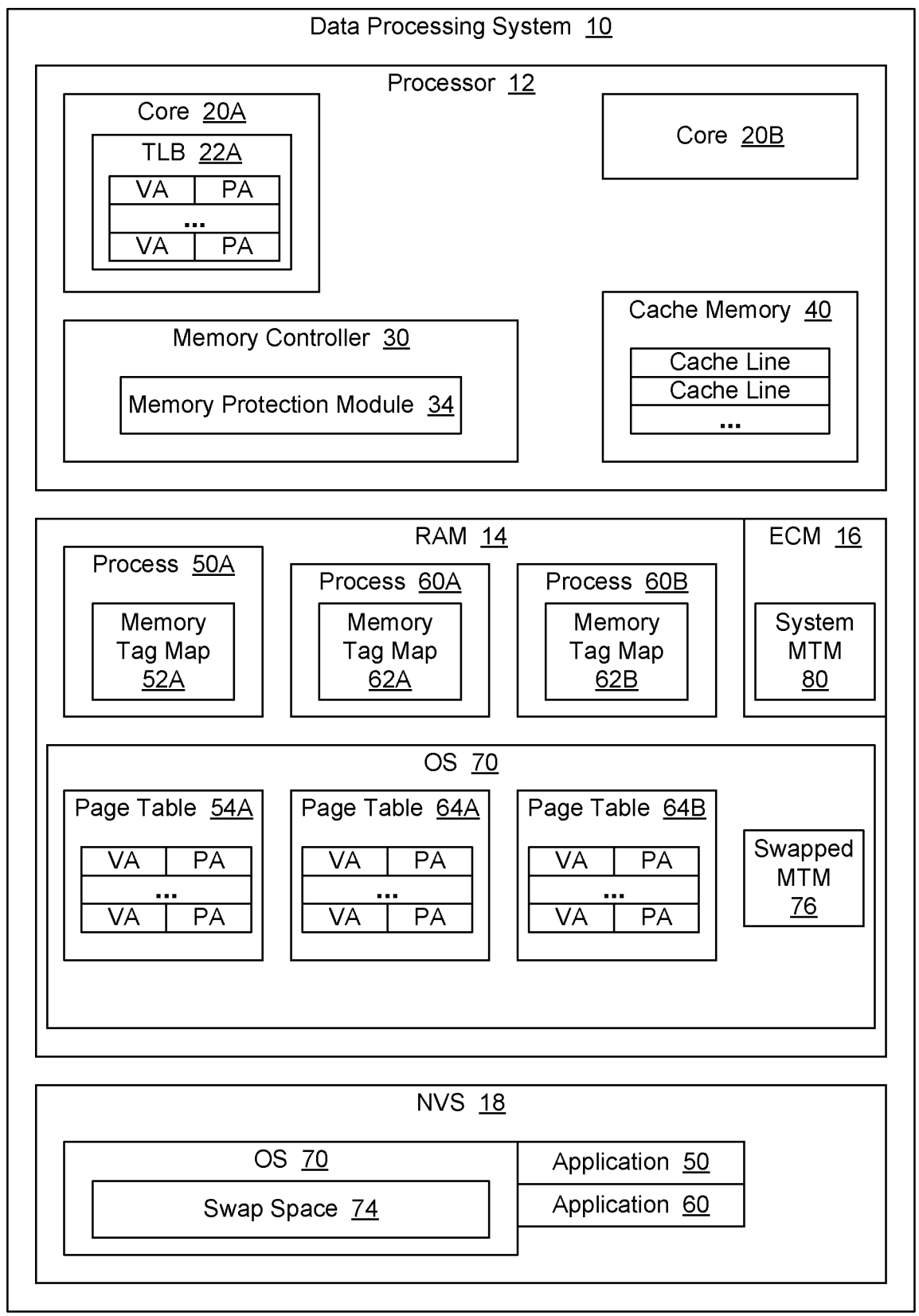
FIG. 1 is a block diagram of an example embodiment of a data processing system that includes technology for managing memory tags.

For purposes of this disclosure, 1024 consecutive bytes may be referred to collectively as a "kilobyte;" 1024 kilobytes (KB) (i.e., 1,048,576 bytes) may be referred to as a "megabyte" (MB); 1024 MB may be referred to as a "gigabyte" (GB); and so on, with terabytes (TB), petabytes (PB), exabytes (EB), etc. Various conventional processors support page sizes of 4 KB, 8 KB, 64 KB, 256 KB, 1 MB, 4 MB, 16 MB, 256 MB, 2 GB, and even higher. In addition, some conventional processors support 64-bit memory addresses. With 64 bits, it is possible to specify memory addresses up to 18.4 exabytes. However, few if any conventional data processing systems actually contain 18.4 exabytes of RAM. Consequently, some high-order bits of a 64-bit address may always contain zeroes. For purposes of this disclosure, such bits may be referred to as "unused."

However, as described in the MET Specification, a data processing system may use one or more of those unused address bits to specify data attributes other than location. For instance, a data processing system may use such bits to store a key identifier (KeyID) for a key to be used to encrypt and decrypt the data that is stored at the memory location specified by the other bits of the address. Alternatively, as described in greater detail below, the unused bits may be used to store other types of information for protecting the data that is stored at the memory location specified by the other bits of the address.

The present disclosure involves technology for providing memory protection on a more granular or finely detailed basis than page-level granularity. In particular, as described in greater detail below, a data processing system may use memory tags to provide for multiple different types of protection for different subdivisions within a page.

For purposes of this disclosure, a sequence of one or more bits in a memory address that is used to specify a data attribute other than location may be referred to as a "memory tag," a "tag section," or simply a "tag." By contrast, the bits in a memory address which do specify the memory location may be referred to as "address bits" or an "address section." Also, the value residing in a memory tag may be referred to as the "tag value" or the "tag color, and the value residing in the address section may be referred to as the "address value." A two-bit memory tag, for instance, may support four different tag values or colors (i.e., the tag values 0 through 3).

As described in greater detail below, a memory controller may protect or manage the data residing at the location specified in the address section of a memory address, based on the tag value specified in the tag section of that memory address. For instance, as described in greater detail below, the memory controller may use the tag value to retrieve metadata associated with the location specified in the address section of the memory address, and the memory controller may protect the data residing at the location, based on that metadata.

As indicated above, a conventional OS organizes virtual memory into pages, using page tables to map virtual memory to physical memory, and swapping data from RAM out to disk a page at a time. However, processors and memory controllers may operate on sections of memory that are smaller than pages. For instance, a memory controller may use a block size that is smaller than a page when copying data to or from processor cache. That block size may be referred to as a "cache line." Thus, a memory controller may copy one cache line at a time when it reads from and writes to cache, and each cache line may be a fraction of the size of a page.

For purposes of this disclosure, when a page is subdivided into (or contains) two or more subdivisions, each subdivision may be referred to in general as a "subpage." And in particular, when a subpage is the same size as a cache line for cache memory in the data processing system, that subpage may be referred to as a "line." For purposes of illustration, this disclosure frequently refers to lines. However, as will be evident to one of ordinary skill in the art, the present teachings may also be used with other types of subpages.

As described in greater detail below, a data processing system may use memory tags to provide protection for different lines within a physical page. The data processing system may thus provide for subpage granular access control, in that the data processing system controls access on the basis of blocks that are smaller than a page. Also, the data processing system may provide software applications with the ability to assign different memory tags or colors to different blocks of memory.

In a data processing system that provides for memory protection with subpage granularity, different lines of a physical page may be protected with different memory tags. Consequently, certain functionalities may be needed from the OS and/or other software to enable the OS to perform kernel operations such as copy-on-write (COW) and swap-in/swap-out (SI/SO) of physical pages. For example, the OS and/or the other software may need to maintain a memory tag map (MTM) for each process, to indicate which tag values are associated with different lines of memory for that process. In one embodiment, the software saves the correct tag values to the MTM in connection with memory allocation operations, and the software may remove tag values from the MTM in connection with operations to deallocate memory, such as the operations performed by a "free" function. An MTM may associate each memory tag with a corresponding virtual address, with a corresponding physical address, or with both.

As described in greater detail below, in one embodiment or scenario, the OS may use software-based line processing for reading and writing a page with fine-grained protection for COW and SI/SO. In other words, when the OS kernel performs COW or SI/SO procedures for a page of physical memory, the OS may read or write each line individually, specifying the address for a line, along with a tag value for that line. This approach may be referred to as "software-based line processing." In particular, the OS may use a loop to read or write each line with the right tag value from the MTM, until the whole physical page has been processed. With software-based line processing, the OS may read and write each line of a page correctly, even though different lines are protected by different tags. However, software-based line processing may entail significant performance overhead. For instance, if the MTM does not associate tags with physical addresses, the OS may need to translate the physical address for each line into the corresponding virtual address, to obtain the tag associated with that virtual address.

Alternatively, the hardware may provide for instructions which enable the OS kernel to read and write a page efficiently, while the hardware provides the proper tag values for each line within the page. This approach may be referred to as "hardware-based line processing." In particular, in one embodiment, the processor supports a "write_tagged_page" instruction which writes content to a page with specified tag values, and a "read_tagged_page" instruction which reads a protected page with the proper tag values. Hardware-based line processing may enable the data processing system to directly compute the tag for each line to be read from RAM or written to RAM, without translating the physical address into the virtual address for each line. Instead, the OS may specify (a) the physical address for the page and (b) the location of the tags in the MTM for that page, and in response the hardware may automatically compute (a) the physical address for each line in the page and (b) the corresponding tag for each line. Similarly, the hardware may provide a fine-grained instruction for reading or writing a single line, instead of a whole page. Furthermore, these instructions may simply provide a method for the software to read a tag for each cache line using the physical address (e.g., a facility that cause the memory controller to return the tag associated with a given physical address). Once the tags are read, the software can read the associated lines using those tags. Consequently, hardware-based line processing may provide the same or similar functionality as software-based line processing, but with better performance. Furthermore, these instructions may provide different granularities, from a page granularity to cache line granularity or even a sub-cache line granularity. The instructions may be part of a native instruction set architecture (ISA) or a wrapper for software to use. If the instructions are part of a wrapper, the underlying implementation may simply be provided by a combination of software libraries with some hardware support. For purposes of this disclosure, the term "facilities" may be used in general to refer to such instructions, wrappers, etc.

The following paragraphs provide additional details for one or more example embodiments of a data processing system with technology for managing memory tags.

FIG. 1 is a block diagram of an example embodiment of a data processing system 10 that includes technology for managing memory tags. As illustrated, data processing system 10 includes a processor 12, RAM 14, and non-volatile storage (NVS) 18. NVS 18 may be implemented as a hard disk drive (HDD) or as any other suitable type of mass storage device. In the illustrated embodiment, processor 12 includes multiple cores 20A and 20B, a memory controller 30, and a cache memory 40. Cache memory 40 may also be referred to simply as cache 40. In one embodiment, components such as core 20A, core 20B, cache 40, and memory controller 30 may all reside in a single chip or substrate, which may be referred to as a "system on a chip" (SoC). In other embodiments, two or more of those components may reside in different chips, which may be connected within a single package of chips or connected across separate packages.

For purposes of illustration, data processing system 10 is depicted with a relatively simple configuration. However, the present teachings are not limited to the illustrated configuration, but may be used to advantage in data processing systems with a wide variety of configurations. For instance, although only a single cache 40 is illustrated, in other embodiments, data processing systems may use multi-level cache systems, and many other types of details may be different in other embodiments. Similarly, core 20B may have the same kinds of features as core 20A or a different set of features. For example, core 20B may be a field-programmable gate array (FPGA), an integrated general-purpose computing on graphics processing unit (GPGPU), an ultra-low power microprocessor (e.g., an Intel Atom® processor) coupled with a big core in a heterogeneous processing environment, etc.

In the embodiment of FIG. 1, NVS includes an OS 70 and multiple applications 50 and 60. Processor 12 may copy OS 70 and applications 50 and 60 from NVS 18 to RAM 14 for execution.

When software running on core 20A or core 20B requests a read from RAM 14 or a write to RAM 14, memory controller 30 mediates those reads and writes. Moreover, memory controller 30 copies data from RAM into cache 40 and updates data in cache 40, since cache 40 can be accessed much more rapidly than RAM 14. In particular, memory controller 30 reads from and writes to cache 40 using a predetermined block size, known as a "cache line," as indicated above. In the illustrated embodiment, the size of each cache line is 64 bytes. Other embodiments may use larger or smaller cache lines.

For purposes of illustration, FIG. 1 depicts a hypothetical scenario in which application 50 is an anti-virus program and application 60 is web browser. For instance, data processing system 10 may be configured to automatically launch application 50 at startup. In FIG. 1, OS 70 has launched application 50 as a process 50A. OS 70 has also launched application 60 as process 60A, for instance in response to user input (e.g., a click on an icon for application 60, a click on a hyperlink, etc.). Also, process 60A has forked to create process 60B.

As illustrated, OS 70 maintains a different page table for each process. In FIG. 1, the page tables for processes 50A, 60A, and 60B are shown as page tables 54A, 64A, and 64B, respectively. The page table for each process maps the virtual addresses (VAs) for that process to physical addresses (PAs). Any suitable data structure or set of data structures may be used to implement page tables, including without limitation hierarchical page tables. Also, although FIG. 1 depicts page tables which include virtual addresses, page tables may be configured to use a virtual address as an index to a physical address without actually saving the virtual address in the page table. For purposes of this disclosure, the information in a page table that enables a core to translate a virtual address into a physical address may be referred to in general as a "page table entry" or a "translation."

In the embodiment of FIG. 1, each core includes a translation lookaside buffer (TLB) that includes a subset of the page table entries from the page tables. In other words, cores use TLBs to cache mappings from page tables, to store the virtual address to physical address translations. Accordingly, a core uses its TLB to translate a virtual address from a process to the corresponding physical address, without resorting to the page table for that process, if the TLB already includes the translation for that virtual address. For purposes of this disclosure, the information in a TLB that enables a core to translate a virtual address into a physical address may be referred to in general as a "TLB entry" or a "translation." For example, in the embodiment of FIG. 1, core 20A includes a TLB 22A, and TLB 22A maps virtual addresses to physical addresses. In addition, although only a single set of translation is depicted in FIG. 1, the TLB in a core may include a different set of translation for each process running on that core. For instance, a TLB entry may include at least part of a virtual address (e.g., the virtual page number), as well as a process identifier (PID) to identify the process associated with that virtual address.

As indicated above, a conventional OS organizes virtual memory on the basis of pages, and the OS may also swap data from memory out to a disk (or another mass storage device) when that data has not been accessed lately and the memory space is needed for other data. In the embodiment of FIG. 1, OS 70 may swap pages out to swap space 74. In the illustrated embodiment, OS 70 manages physical memory and virtual memory using a page size of 4 KB. Other embodiments may use larger or smaller page sizes. As indicated above, in the illustrated embodiment, memory controller 30 manages cache memory 40 using a cache line size of 64 bytes. Also, a 4 KB page of memory may be subdivided into 64 lines, with each line containing 64 bytes. Data processing system 10 uses memory tags to provide for multiple different types of protection for different lines (or other subdivisions) within a page of memory. For instance, in one embodiment or scenario, a process may assign different tags to different lines (or subpages) allocated to that process. The different memory tags cause memory controller 30 to provide different types of protection for the lines associated with the different tags. For instance, different tags may identify different keys for encrypting different lines. Alternatively, as described in greater detail below, tags may be used to provide other types of protection. In the embodiment of FIG. 1, some or all of the control logic for enforcing protection based on memory tags is implemented as a memory protection module 34 in memory controller 30.

In one embodiment or scenario, each process maintains its own MTM, to keep track of which tags are assigned to which lines of virtual memory. In FIG. 1, the MTMs for processes 50A, 60A, and 60B are depicted as MTMs 52A, 62A and 62B, respectively. Thus, each process may use its MTM to associate different memory tag values with different lines of virtual memory for that process. For purposes of this disclosure, an MTM that is maintained by a process may be referred to as a "user MTM."

In addition or alternatively, one or more other components of a data processing system may maintain one or more MTMs for the tagged memory lines associated with a process. For instance, OS 70 may maintain one or more MTMs, as described in greater detail below. Such MTMs may be referred to in general as "kernel MTMs." In FIG. 1, RAM 14 includes a kernel MTM that is referred to as a "swapped MTM" 76. OS 70 may use swapped MTM 76 to save memory tag values and corresponding virtual and/or physical addresses for pages that have been swapped out of RAM for a process.

In addition or alternatively, a core may maintain one or more MTMs. Such MTMs may be referred to in general as "system MTMs." As illustrated in FIG. 1, in one embodiment, core 20A stores system MTM 80 in a portion of RAM 14 that has been reserved for error detection and/or correction purposes, such as one or more error-correcting code (ECC) memory chips or modules. In FIG. 1, such memory is depicted as error-correction memory (ECM) 16. In one embodiment, when core 20A writes to RAM 14, core 20A specifies the tag as part of the memory address, but memory protection module 34 strips off the tag and stores it in ECM 16. Thus, memory protection module 34 uses system MTM 80 to store a tag for each line (in each physical page) that was allocated with memory tag protection. Thus, from the perspective of core 20A, memory controller 30 simply stores the tags inline with the data, in that memory controller 30 writes 64B of data to a physical address and also 1B of tag associated with that physical address in response to a single write request from core 20A. Similarly, memory controller 30 may be configured to save the data and the tag as part of a single write operation. In addition, core 20A may allow OS 70 to obtain a tag value for a specified physical address by using a special request value for addressing the memory controller. Thus, in different embodiments or scenarios, MTMs may be stored, for example, (a) in memory that can be read by an application or an OS, or (b) in memory that cannot be read by an application or an OS (e.g., in ECM). In addition or alternatively, an application and/or an OS may not know where an MTM is stored, but a processor may provide an ISA extension, an application programming interface (API), or some other facility through which the application and/or the OS can obtain tags, to provide for paging and COW, for example.

Figure 2:
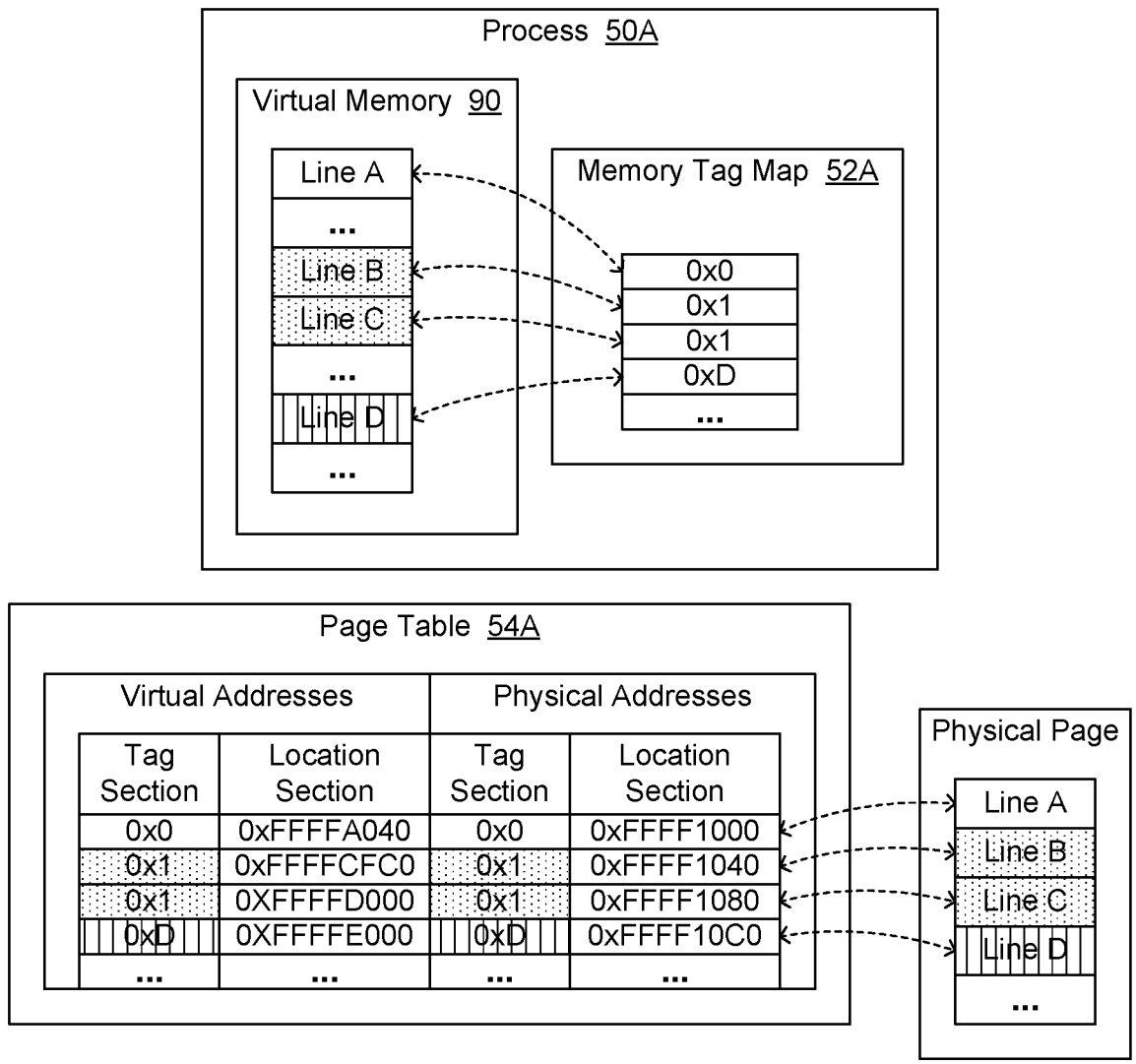
FIG. 2 is a block diagram illustrating various data structures used by the data processing system of FIG. 1 to manage memory tags.

Any suitable type of data structure (e.g., a list, a table, etc.) may be used to implement an MTM. Also, any suitable format may be used for memory tags. For instance, as shown in FIG. 2, each virtual address and each physical address in page table 54A includes a tag section that spans 8 bits and occupies the high order byte. Accordingly, MTM 52A stores each memory tag in one byte, in a data processing system with a page size of 4K and a line size of 64 bytes. Consequently, an MTM that is $1/64^{th}$ the size of a page may be used for saving the tags for a page. In other embodiments, the tag section may be smaller or larger, and it may occupy different portions of the virtual and physical addresses. In addition, a tag section may include two or more subsections. For instance, an 8-bit tag section may include tag-type subsection in the high-order nibble and a tag-value subsection in the low-order nibble Also, an MTM may be optimized to enable a single entry to cover a range of lines, instead of having a separate entry for every line. For example, if a single tag is used for a whole page, the MTM may only contain a single entry for that page, thus reducing the storage needed for the MTM.

In the embodiment of FIG. 1, process 50A utilizes memory to store program data. In addition, lower level components (e.g., OS 70) use other types of data to manage the memory that process 50A uses to store program data. For purposes of this disclosure, the term "metadata" may be used in general to refer to the data that the lower level components use to manage the memory that programs such as process 50A utilize to store program data. The metadata that relates to the actual program data may also be stored in memory. For instance, the data in the MTMs may be referred to as metadata. Examples of metadata include tags, keyIDs, message authentication codes (MACs), ECCs, and/or other data that is associated with a line (or other subpage) that is managed with granularity that is finer than page granularity. Thus, the data in an MTM may include, for instance, a keyID and a MAC that has been computed, based on that keyID. Alternatively, an MTM entry may include a MAC that is based on a tag value from a memory address, but that tag value may not be stored in the MTM entry.

FIG. 2 is a block diagram illustrating example embodiments of various data structures used by data processing system 10 to manage memory tags. For instance, FIG. 2 shows more details for MTM 52A and page table 54A from FIG. 1. FIG. 2 also illustrates how the data in those data structures relates to different portions of memory that have been allocated to process 50A. Those portions of memory may have been allocated using a process like the one described below with regard to FIG. 3A.

In particular, in the hypothetical scenario of FIG. 2, process 50A has dynamically allocated three different blocks of virtual memory with different types of memory tag protection. One of those blocks (depicted as "Line A") happens to be the size of a line (i.e., 64-bytes), and it has been allocated with a null or zero tag value (0x0). Another of those blocks happens to be the size of two lines (i.e., 128-bytes), and it has been allocated with a tag value of 0x1. That block is depicted as "Line B" and "Line C." Another of those blocks (depicted as "Line D") has been allocated with the tag value of 0xD.

In FIG. 2, Lines A through D are depicted within the virtual memory 90 of process 50A. For purposes of illustration, FIG. 2 shows each different line of allocated memory as a distinct unit within virtual memory 90. In other words, each of the blocks or lines shown in virtual memory 90 is the same size as a cache line. Accordingly, those blocks are depicted as Line A, Line B, Line C, Line D, etc. Also, different types of fill are shown in each line, to denote the different tags associated with each line, with no fill used for tag value 0x0, dotted fill used for tag value 0x1, and vertical lines used for tag value 0xD.

However, when process 50A allocates each block of memory, process 50A may not specifically request a line (or multiple lines), but may instead simply request a particular number of bytes. In addition, process 50A may disregard page boundaries when requesting allocation of memory. Accordingly, Line A may reside in one virtual page, Lines B and C may reside in another virtual page, and Line D may reside in another virtual page, for instance. Since memory tags occupy high-order bits of virtual memory addresses, lines with different tags will not end up in the same page of virtual memory. Nevertheless, lines with different tags may end up residing in the same page of physical memory, as described in greater detail below. When a data processing system allows multiple virtual pages to be mapped to the same physical page, the virtual pages may be considered "aliases," and the data processing system may be said to support "page aliasing."

As shown in FIG. 2, process 50A also maintains MTM 52A, so that MTM 52A associates a particular tag with each of Lines A through D. In particular, MTM 52A associates the tag value 0x0 with Line A, the tag value 0x1 with Lines B and C, the tag value 0xD with Line D, etc. More details with regard to maintaining MTM 52A are provided below in connection with FIG. 3A.

Also, in the embodiment of FIG. 2, when OS 70 manages page table 54A, OS 70 may include both a tag section and a location section in each virtual address and each physical address. The tag section includes the tag value to be used for that virtual or physical address. For instance, with regard to Line B in FIG. 2, the complete 64-bit virtual address for that line is provided below in hexadecimal and binary representations (with the prefix "0x" denoting hexadecimal representation, the prefix "0b" denoting binary representation, and with a space inserted after each set of 16 bits in the binary representation for readability):

0x10000000FFFFCFC0
0b0001000000000000 0000000000000000 1111111111111111 1100111111000000

(As understood by those of ordinary skill in the art, since each character in hexadecimal representation depicts 4 bits, a 64-bit address may be expressed in 16 hexadecimal characters.) The practice of including memory tags as part of the physical address in translation facilities such as the page table and the TLB may be referred to as "explicit tag translation."

In another embodiment, a data processing system may use a practice referred to herein as "TLB bypassing" to handle memory access requests from an application. Under TLB bypassing, the OS still includes both a tag section and a location section in each virtual address, and the OS stores the tag value in the tag section. But the OS does not store tag values in the physical addresses in the page tables or the TLB. Instead, the core disregards the tag when doing the address translation to determining the corresponding physical address, and then the core inserts the tag from the virtual address into the physical address that is sent to the memory controller. In other words, the core sends a tagged physical address to the memory controller. The memory controller then strips the tag from the memory address and uses the memory address without the tag (i.e., the "untagged address") to access the data. However, the memory controller still uses the tag for memory protection. For instance, when the tag is a KeyID, the memory controller may use the corresponding key to encrypt or decrypt the data at that location. In addition or alternatively, the memory controller may generate integrity information such as a MAC based on that key. Or, when the tag is a different type of value, the memory controller may determine whether the tag value from the core is proper. In particular, the memory controller may determine whether the tag value (supplied by the core in connection with a request to access the specified physical location) is proper by comparing that tag value with a tag value that was previously stored in an MTM for the current process or the system MTM. For purposes of this disclosure, a tag value that is stored in an MTM may be referred to as an "original" tag value or a "proper" tag value. For instance, if Line B has a tag value of 0x1 associated with it, but core 20A tries to access Line B using a tag value of 0x2, memory controller 30 will report an access control violation, due to a tag mismatch. Alternatively, when the tag is a KeyID, memory controller 30 will use the tag to select a cryptographic key. When core 20A supplies an incorrect tag, memory controller 30 will select an incorrect key, which will result in a cryptographic integrity failure. Consequently, memory controller 30 may report an access control violation.

Also, to support tag verification, for each process that uses tags for memory protection, the data processing system may maintain an MTM to identify the proper tag for each physical line of protected memory allocated to that process. For example, tags may be tied to physical addresses in kernel MTMs or system MTMs.

Also, as indicated above, in the hypothetical scenario of FIG. 2, the virtual address for Line B is 0x10000000FFFFCFC0. Also, the virtual address for Line C is 0x10000000FFFFD000. Thus, Lines B and C are adjacent, with Line B occupying the last 64 bytes of one virtual page, and Line C starting at the beginning of the next virtual page. Also, Lines B and C each have the tag value of 0x1. However, as illustrated, OS 70 may happen to map Lines B and C to the same page of physical memory. In fact, in the scenario of FIG. 2, OS 70 has mapped Lines A through D to the same physical page. However, it should be noted that page table 54A depicts a complete physical address for purposes of illustration, but in practice, a page table may include only part of a physical address (e.g., a frame number to identify a page of physical memory), and a core may use the virtual address to compute the rest of the physical address (e.g., an offset).

When process 50A subsequently accesses any line (e.g., Line D), process 50A automatically supplies the proper tag value (e.g., the value of 0xD), since that tag value is embedded in the virtual address used by process 50A to access that line. Consequently, memory protection module 34 uses the proper tag value to manage protection of the data read from and written to RAM 14 by process 50A. For instance, if the tags serve as KeyIDs, memory protection module 34 may use the key identified by the value 0xD to encrypt the data from process 50A when memory controller 30 writes Line D from cache 40 to RAM 14, and memory protection module 34 may also use that key to decrypt the data when memory controller 30 reads Line D from RAM 14 into cache 40. Also, memory controller 30 may use that key to generate integrity data, as indicated above. And if the integrity data for a read does not match integrity data that was previously generated and stored in an MTM when the program data was written to RAM 14, memory controller 30 may report a tag mismatch. Also, when process 50A uses a virtual address to access memory, core 20A and/or memory controller 30 may use any suitable techniques to carry forward the proper tag to access the physical address associated with the specified virtual address. For instance, as described in U.S. patent application publication 2017/0285976 titled "Convolutional Memory Integrity", the core and/or the memory controller may use page-level aliasing to create different address pools (or ranges) that map to the same memory locations, while having the effect of changing the tags, which may encode key domain information.)

As described in greater detail below, in the illustrated embodiment, when OS 70 performs COW and SI/SO for pages allocated to a process, OS 70 uses the MTM for that process to obtain the correct tag value for reading from or writing to each line within a page.

Figure 3A:
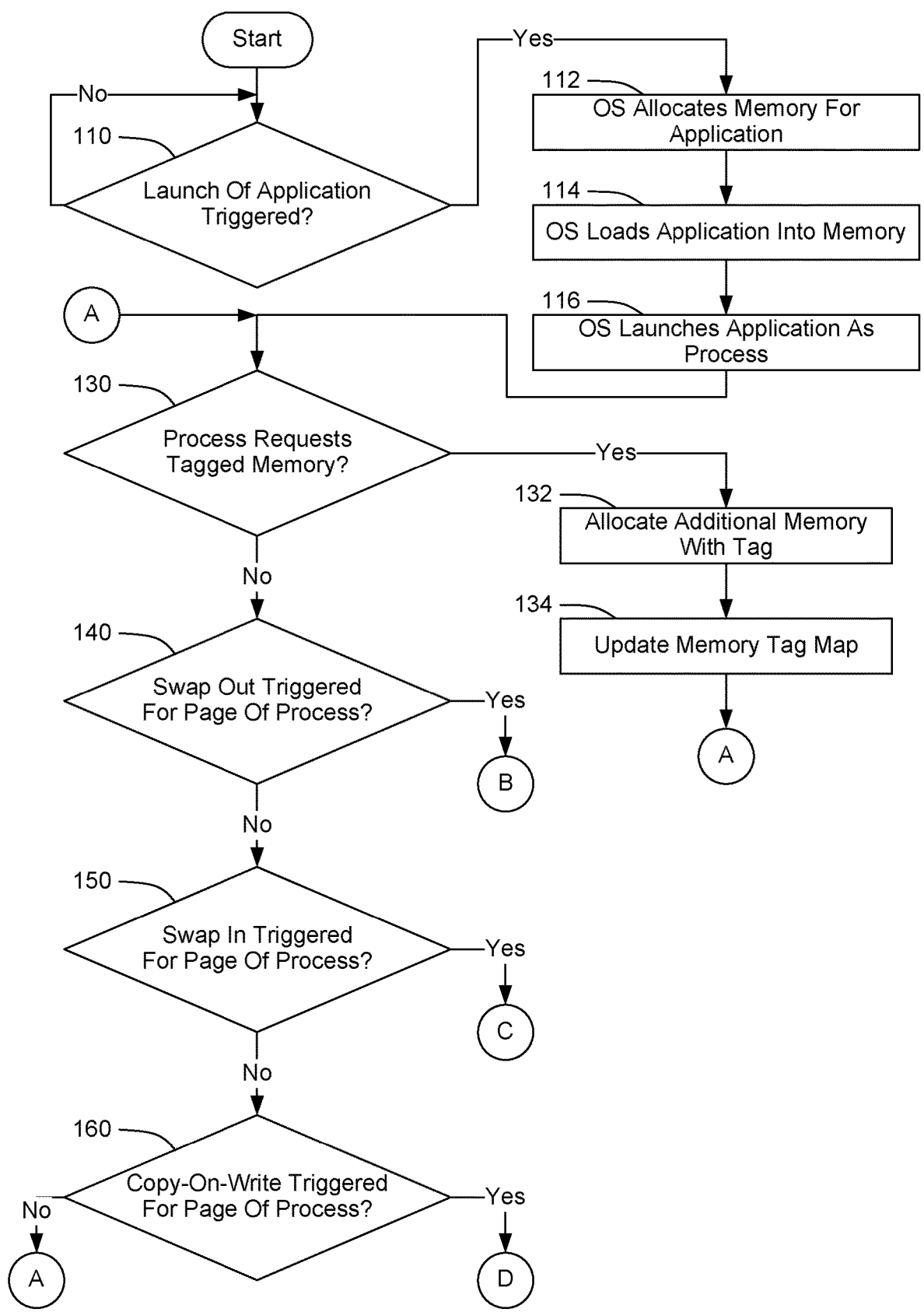
FIGS. 3A-3D present a flowchart of an example embodiment of a process for managing memory tags.

FIGS. 3A through 3D present a flowchart of an example embodiment of a process for managing memory tags. For purposes of illustration, FIGS. 3A through 3D are described herein with regard to a hypothetical scenario involving OS 70 running in data processing system 10. In particular, FIG. 3A illustrates a hypothetical scenario involving OS 70 launching application 50 as process 50A, and process 50A assigning different tags to different sections of memory allocated to process 50A.

The process of FIG. 3A may start with OS 70 determining whether an application should be launched, as shown at block 110. For instance, as indicated above, in the illustrated embodiment, application 50 is an anti-virus application, and data processing system 10 is configured to launch application 50 at startup. Accordingly, as part of the startup process, OS 70 may determine that application 50 should be launched. In response to that determination, OS 70 may allocate an initial block of virtual memory of a predetermined size for process 50A, as shown at block 112. OS 70 may then load the code for application 50 into the initial block of memory, and OS 70 may then launch application 50 as process 50A, as shown at block 114 and 116.

As shown at block 130, process 50A may then request dynamic allocation of additional tagged memory for itself at runtime. For instance, process 50A may use a memory allocation function from a statically linked library or a dynamically linked library (DLL) such as glibc to request allocation of a memory block of a specified size to be added to the heap for process 50A. In one embodiment or scenario, that memory allocation function is similar to the malloc function, but with enhancements to support memory tags. For purposes of this disclosure, such an enhanced memory allocation function may be referred to as "malloct." As part of the malloct request, process 50A may specify a memory tag value to be associated with memory block being allocated. Alternatively, process 50A may use a library with a malloc function that has been enhanced (relative to a conventional malloc function) to automatically use memory tags whenever process 50A dynamically allocates memory. The malloc function may use any suitable technique to select the tag value or values to be used, including without limitation a round-robin technique. For purposes of this disclosure, the functions or programs for allocating memory (e.g., malloc or malloct), for freeing memory, etc., may be referred to in general as a "memory manager." In response to a request for memory allocation, the memory manager may allocate a virtual memory block of the requested size to process 50A, as shown at block 132, and the memory manager may return the virtual address for the start of that block to process 50A. Moreover, as shown in FIG. 2, the virtual address may include a tag section which includes the tag value that was used by the memory manager (e.g., the tag that was specified by process 50A to malloc or the tag that was automatically selected by malloc), along with a location section to identify the location of the allocated memory. In other words, the virtual address that the memory manager returns to process 50A is encoded with the specified memory tag value.

As shown at block 134, process 50A may then update MTM 52A to identify the memory tag that is associated each line of virtual memory that was just allocated. In addition or alternatively, whenever OS 70 maps the allocated virtual memory to physical memory, core 20A and/or memory controller 30 may automatically update system MTM 80 to associate each line of that physical memory with the proper memory tag value.

The process of FIG. 3A may then return to block 130 via page connector A. Data processing system 10 may then repeat the operations depicted in blocks 132 and 134 to allocate additional blocks of virtual memory to process 50A in response to further allocation requests from process 50A. As indicated above, when process 50A subsequently accesses any line, process 50A automatically supplies the proper tag value, since that tag value is embedded in the virtual address used by process 50A to access that line. Consequently, memory protection module 34 uses the proper tag value to manage protection of the data read from and written to RAM 14 by process 50A.

Referring again to block 130 of FIG. 3A, after process 50A has been launched, if data processing system determines that process 50A is not currently using some region of memory, OS 70 may determine whether any of the physical pages of memory for process 50A should be swapped out (e.g., to make room for a different page of virtual memory to be swapped in to physical memory), as shown at block 140. If no pages need to be swapped out, OS 70 may then determine whether a page needs to be swapped in, as shown at block 150. For instance, OS 70 may determine that a page needs to be swapped in, in response to process 50A attempting to read or write to a page that was swapped out. If no pages need to be swapped in, OS 70 may determine whether copy-on-write (COW) has been triggered for a page of process 50A, as shown at block 160.

With regard to COW, when one process forks to create a second process, such as when process 60A forks to create process 60B, instead of creating a whole new set of physical pages for the process 60B, OS 70 may create page table entries for process 60B which map the virtual addresses of process 60B (which match the virtual addresses of process 60A) to the same physical addresses as the pages used by process 60A. If neither process ever modifies any of those pages, it is not necessary to actually duplicate those physical pages. For purposes of this disclosure, a physical page that is shared in this manner by two different process may be referred to as a "shared page." However, when one of the processes (e.g., process 60A) does write to one of its pages, OS 70 may then create a new physical page, so that process 60A can access the modified version of the page, and process 60B can access the unmodified version of the page. Accordingly, OS 70 may determine that COW has been triggered in response to detecting that a process is writing to a shared page.

Referring again to block 160 of FIG. 3A, if COW has not been triggered, the process may return to block 130, and OS 70 may continue to watch for (a) a request for more memory, (b) the need to swap a page in or out, or (c) the need for COW, as indicated above.

Figure 3B:
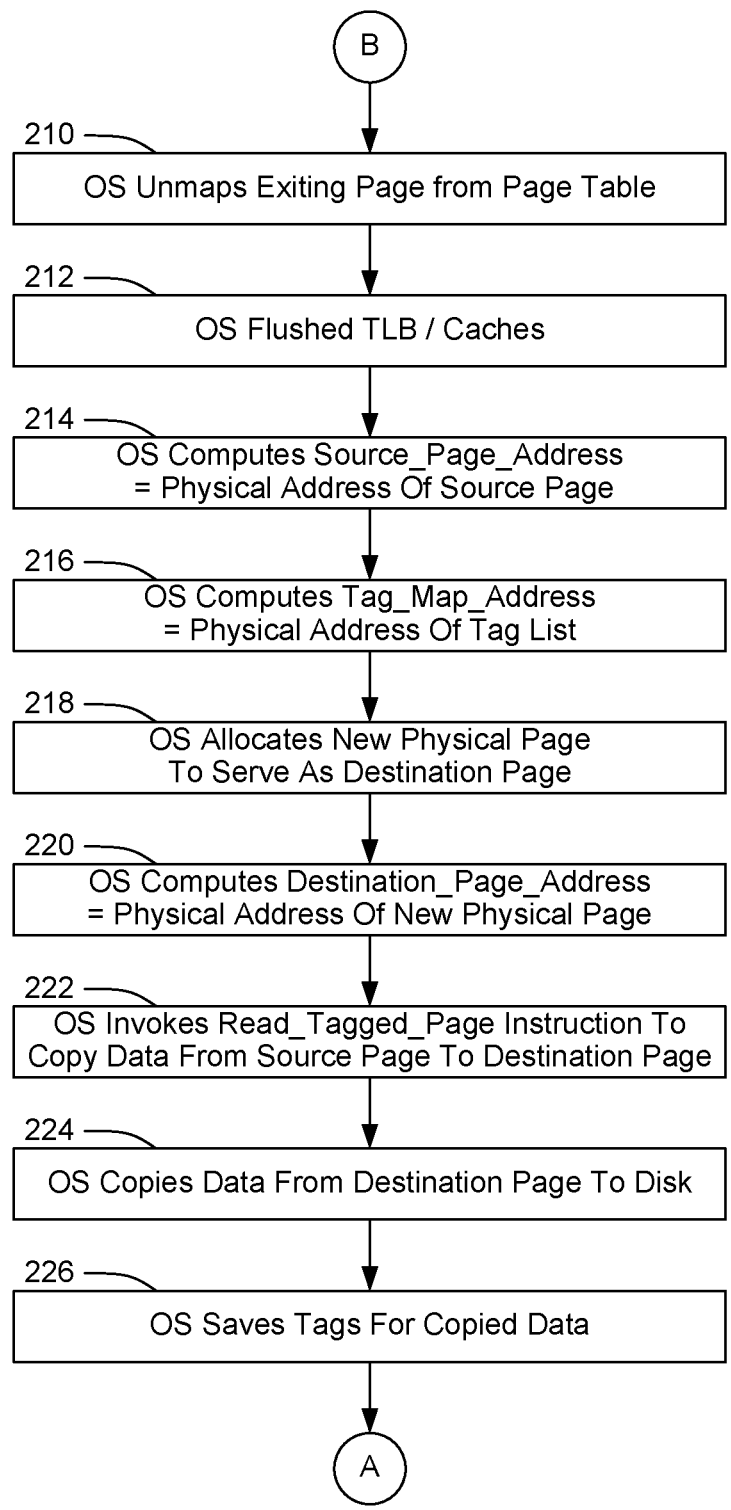

However, referring again to block 140, if a physical page needs to be swapped out, the process passes through page connector B to FIG. 3B.

FIG. 3B depicts an example embodiment of a process for swapping a page of tagged memory out of RAM 14 for process 50A. For purposes of illustration, the embodiment depicted in FIG. 3B includes many details pertaining to specific data structures and operations. However, as described in greater detail below, other embodiments may provide enhanced low-level support for one or more operations, thereby simplifying the operations to be performed by the OS.

The process of FIG. 3B may start with OS 70 invalidating the page table entry which links the physical page to be swapped out (the "exiting page") with a virtual page, as shown at block 210. In other words, OS 70 unmaps the exiting page from page table 54A as page not present in RAM. As shown at block 212, OS 70 also flushes TLB 22A and any pertinent caches.

OS 70 also performs various steps relating to the read_tagged_page instruction mentioned above and described in greater details below. For instance, as shown at block 214, OS 70 stores the physical address of the exiting page in a register or variable referred to herein as "Source_Page_Address." In other words, referring again to FIG. 2, OS 70 loads the location section of the physical address to Source_Page_Address. Also, as shown at block 216 of FIG. 3B, OS 70 determines the physical address of the relevant portion of the MTM for the exiting page and stores that physical address in a register or variable referred to herein as "Tag_Map_Address." For instance, OS 70 may load Tag_Map_Address with the address of the section of system MTM 80 that pertains to the exiting page.

As shown at block 218, OS 70 may allocate a new physical page to serve as temporary storage. For purposes of this disclosure, that new physical page may be referred to as the "destination page." OS 70 then stores the physical address of the destination page in a register or variable referred to herein as "Destination_Page_Address," as shown at block 220.

As shown at block 222, OS 70 then invokes a special tag management instruction to copy a page of data from the source page to the temporary destination page. For purposes of this disclosure, that instruction may be referred to as a "read_tagged_page" instruction. As described in greater detail below, OS 70 supplies the read_tagged_page instruction with the Source_Page_Address, the Tag_Map_Address, and the Destination_Page_Address. The read_tagged_page instruction then uses the proper tag for each line to copy the data from each line in the source page to a corresponding line in the destination page. For instance, if the tag is a KeyID, the read_tagged_page instruction uses the proper key for each line to decrypt the data that is read from the source page before copying that data to the destination page.

The following "Read_Tagged_Page" table presents example pseudocode in the left column and corresponding comments in the right column to illustrate further details for an example embodiment of the read_tagged_page instruction.

| read_tagged_page (source_page_addr, tag_map_addr, destination_page_addr): | For reading a tagged page using a given tag map. |
|---|---|
| for i = 0 to 63 do | For a page with 64 lines: |
|     tag <- tag_map_addr[i] | Get the tag for the current source line from the tag map. |
|     source_line_addr <- source_page_addr + i*64 | Compute the address of current source line within the source page. |
|     tagged_line_addr <- | Add the tag to the tag section |

| | |
|---|---|
| set_tag (source_line_addr, tag) | of the address of current source line. |
| data <- read_data(tagged_line_addr) | Use the full address (with tag) to read the current line of data from the source page. |
| destination_line_addr <- destination_page_addr + i*64 | Compute the address of current destination line within the destination page. |
| write_data (destination_line_addr, data) | Write the line of data to the current destination line. |
| Done | |

In the above pseudocode, i*64 denotes the offset to the current line within the source page, since the size of each line in the example embodiment is 64 bytes. Accordingly, line 0 within the page starts at offset 0, the next line starts at offset 64 (0x40), the next at 128 (0x80), and so on, with the last line starting at offset 4032 (0xFC0). Accordingly, the read_tagged_page instruction iterates over 64 lines in a page (0 to 63), and in every iteration it adds 64 to the current address, as this is the size of a line in bytes. However, those numbers would change in embodiments using a different granularity or a different page size.

Thus, the read_tagged_page instruction enables OS 70 to read a page full of data that is protected with multiple different tags in RAM 14 and save that data to another location in memory (e.g., for COW), or to disk (or other NVS) (e.g., for a memory mapped file). And the read_tagged_page instruction includes the proper tag as part of the physical address for each line that is read, so that memory protection module 34 can use the proper tag when reading each line of data from RAM 14 (e.g., when performing the "read_data" function shown in the above pseudocode). Also, the above pseudocode illustrates a read_tagged_page instruction which uses the tag_map_addr to find the relevant tags for each line being read. However, as indicated above, in one embodiment, core 20A and/or memory controller 30 may store the tags for each line in each page of tagged memory in system MTM 80. In such an embodiment, the tag_map_addr parameter may be omitted from the read_tagged_page instruction, and the instruction may simply determine the proper tags based on the source_page_addr.

As shown at block 224, OS 70 then copies the data from the temporary destination page to swap space 74 in NVS 18. In addition, since the data in the destination page is unprotected, OS 70 may protect that data (e.g., by encrypting it with a different key or inherently protect the data using native encryption (e.g., by using technology that provides full disk encryption, such as the technology provided by Microsoft Corporation under the name or trademark of "BitLocker") before copying that data to swap space 74. However, in another embodiment, the OS may use a variant of the read_tagged_page instruction to perform a direct memory access (DMA) straight to disk, hence eliminating the temporary destination page. For instance, if the swap file is memory mapped, the read_tagged_page instruction may enable the OS to specify the location of the part of the swap file that is to receive the data being swapped out, and an operation like the one referred to above as "write_data (destination_line_addr, data)" may copy the data to NVS instead of memory.

As shown at block 226, OS 70 may also save the tags for the data that was saved, so that OS 70 may use those tags when subsequently swapping the page back into RAM 14. OS 70 may use any suitable techniques for saving those tags.

For instance, referring again to FIG. 1, OS 70 may save those tags in a swapped MTM 76, which may be stored in RAM 14 and/or in NVS 18. Swapped MTM 76 may identify the tags for each line in each page of tagged memory that has been swapped out for any process.

The process of FIG. 3B may then return to FIG. 3A through page connector A. OS 70 may then continue to monitor conditions and determine whether more memory has been requested, whether another page should be swapped out, whether a page should be swapped in, or whether COW has been triggered, as indicated above. If OS 70 determines that a page should be swapped in, the process may pass from block 150 through page connector C to FIG. 3C.

Figure 3C:
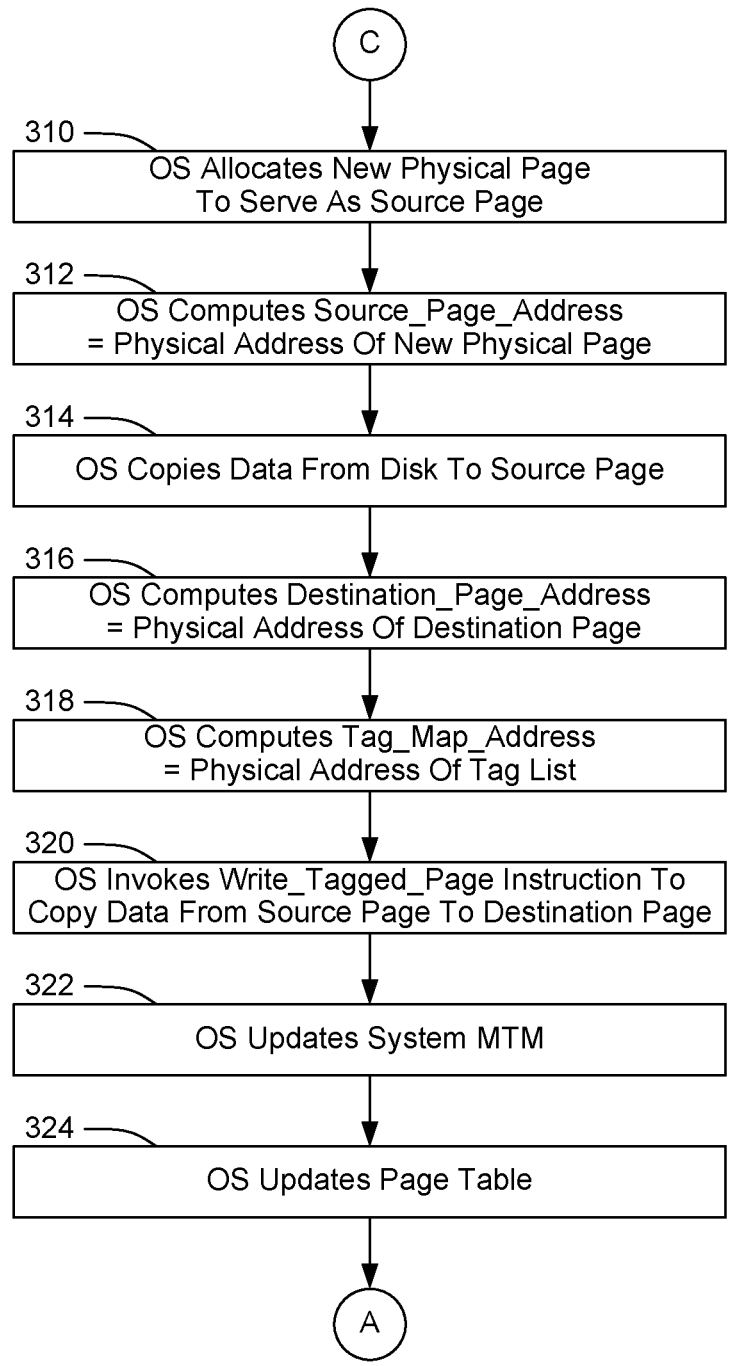

FIG. 3C depicts an example embodiment of a process for swapping a page of tagged memory back in to RAM 14. As with FIG. 3B, for purposes of illustration, the embodiment depicted in FIG. 3C includes many details pertaining to specific data structures and operations. However, as described in greater detail below, other embodiments may provide enhanced low-level support for one or more operations, thereby simplifying the operations to be performed by the OS.

As shown at block 310, the process of FIG. 3C may start with OS 70 allocating a new physical page to serve as temporary storage. (Or, as described in greater detail below, if DMA is used, temporary storage may not be needed.) For purposes of this disclosure, that new physical page may be referred to as the "source page." OS 70 then stores the physical address of the source page in a register or variable referred to herein as "Source_Page_Address," as shown at block 312. As shown at block 314, OS 70 then copies the data for the page to be swapped in from swap space 74 to the temporary source page that was just allocated. Also, if OS 70 encrypted the data before saving it to swap space 74, OS 70 may decrypt the data before storing it to the source page.

As shown at block 316, OS 70 then populates a register or variable referred to herein as the "Destination_Page_Address" with the physical address of the location in RAM 14 that is to receive the page of data that is being swapped back in (i.e., the physical address of the "returning page"). For instance, OS 70 may populate the location section of the Destination_Page_Address with the address of the physical page to be used, while storing zeroes in the tag section of the destination page address. As shown at block 318, OS 70 also stores the physical address of the pertinent portion of the MTM for the returning page in a register or variable referred to herein as "Tag_Map_Address." For instance, in one embodiment, OS 70 uses the address of MTM 52A, or the address of the portion of MTM 52A that corresponds to the returning page. Alternatively, OS 70 may use the address of swapped MTM 76.

As shown at block 320, OS 70 then invokes a special tag management instruction to copy a page of data from the temporary source page to the destination page. For purposes of this disclosure, that instruction may be referred to as a "write_tagged_page" instruction. As described in greater detail below, OS 70 supplies the write_tagged_page instruction with the Source_Page_Address, the Tag_Map_Address, and the Destination_Page_Address.

The following "Write_Tagged_Page" table presents example pseudocode in the left column and corresponding comments in the right column to illustrate further details for an example embodiment of the write_tagged_page instruction.

```
write_tagged_page                  For writing a tagged page using
  (source_page_addr, tag_map_addr,   a given tag map.
  destination_page_addr):
  for i = 0 to 63 do                 For a page with 64 lines:
    source_line_addr <-                Compute the address of current
    source_page_addr + i*64            source line within the source
                                       page.
    data <-                            Read the data from the current
    read_data (source_line_addr)       source line.
    tag <-                             Get tag for the current
    tag_map_addr[i]                    destination line from the tag
                                       map.
    destination_line_addr <-           Compute the address of current
    destination_page_addr + i*64       destination line within the
                                       destination page.
    tagged_line_addr < set_tag         Add the tag to the address of
    (destination_line_addr, tag)       current destination line within
                                       the destination page.
    write_data                         Write tagged data to the
    (tagged_line_addr, data)           destination line address.
Done
```

Thus, the write_tagged_page instruction enables OS 70 to swap a page full of data into RAM 14 while applying the proper tag to each line within that page. In addition, if OS 70 encrypted the data in swap space 74, the "read_data" function shown in the above pseudocode may decrypt that data, if it was not decrypted before it was saved to the source page. Then, if the tag for a line represents a KeyID, the "write_data" function shown in the above pseudocode may encrypt that data with the key identified by that KeyID.

However, as with the read_tagged_page instruction, in another embodiment, the OS may use a variant of the write_tagged_page instruction to perform a DMA straight from disk, hence eliminating the temporary source page. For instance, if the swap file is memory mapped, the write_tagged_page instruction may enable the OS to specify the location of the part of the swap file that contains the data being swapped in, and an operation like the one referred to above as "read_data (source_line_addr)" may read the data from NVS instead of memory.

As shown at block 322, OS 70, core 20A, and or memory controller 30 may then update system MTM 80 to identify the proper tag value for each line in the entering page. As shown at block 324, OS 70 may then update page table 54A to map the entering page to the proper virtual address or addresses.

The process of FIG. 3C may then return to FIG. 3A through page connector A. OS 70 may then continue to monitor conditions and determine whether more memory has been requested, whether another page should be swapped out, whether a page should be swapped in, or whether COW has been triggered. If OS 70 determines that COW has been triggered, the process may pass from block 160 through page connector D to FIG. 3D.

Figure 3D:
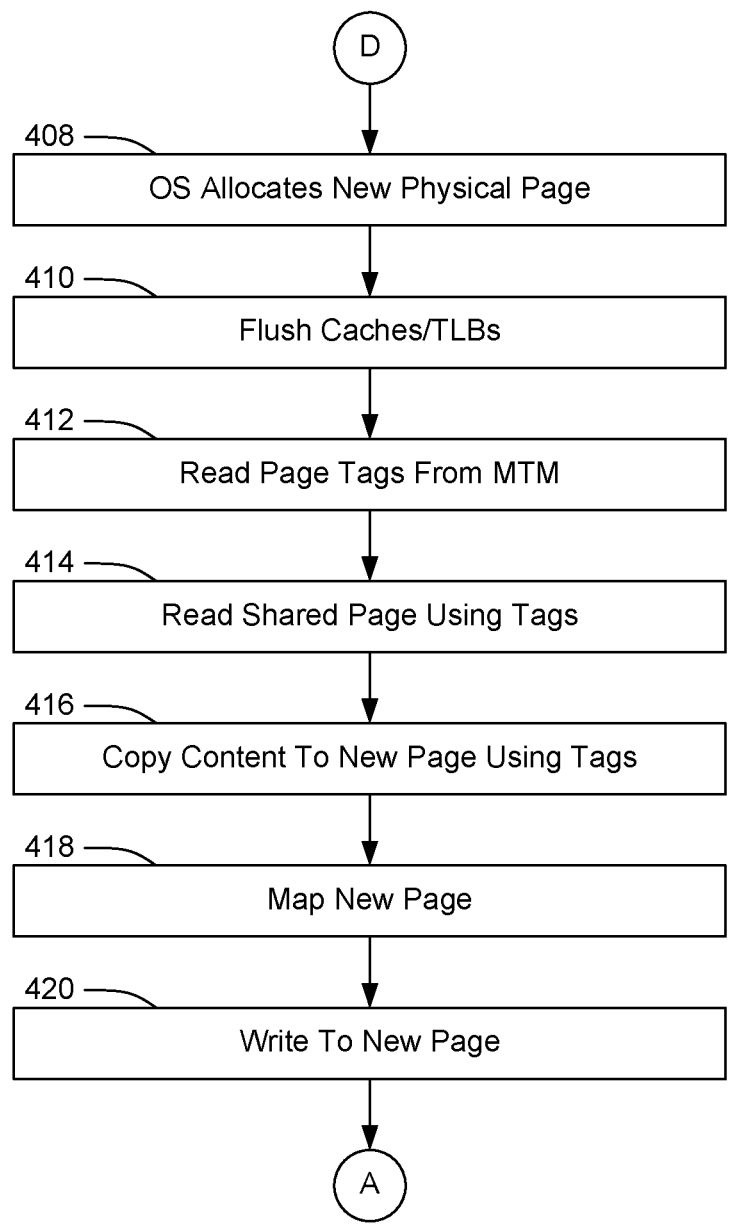

FIG. 3D depicts an example embodiment of a process for handling COW for a page of tagged memory. For purposes of illustration, that process is described below with regard to a hypothetical scenario involving processes 60A and 60B sharing a page of physical memory, as indicated above. The process of FIG. 3B may be triggered in response to process 60A executing an instruction which writes to that "shared page." As shown at block 408, OS 70 may then allocate a new physical page of memory. As shown at block 410, OS 70 may then flush the TLBs for processes 60A and 60B and any pertinent caches.

As shown at block 412, OS 70 may then read the tags for the shared page from system MTM 80. Also, since conventional load/store instructions are not able to address ECM 16 to explicitly read or modify the memory tags stored there, in one embodiment, core 20A and memory controller 30 support a privileged instruction (e.g., "read_memory_metadata") to read memory metadata from ECM 16 (or from another form of hidden or sequestered memory that is not directly visible to the OS), given a specific physical address of data. For instance, read_memory_metadata(phys_addr) returns the metadata for the line at the physical location "phys_addr" in memory. As indicated above, that metadata may include a tag value such as a keyID, a MAC, etc. In addition or alternatively, OS 70 may use a special tag value to tell the memory controller not to read the actual data contents of the addressed memory location, but instead to read the associated ECC memory (or from another form of hidden or sequestered memory) for the given addressed memory and return that metadata. This special tag value (or memory range) can be restricted so that only the OS, or a virtual machine monitor (VMM), or other privileged software may use it to get the tag values for a page, thus, preventing lower-privileged malicious software functions from just reading others' tag assignments.

As shown at block 414, once OS 70 obtains the tags (or other metadata) for the shared page, OS 70 may then use those tags to read the shared page, one line at a time. For instance, of the tags are KeyIDs, memory protection module 34 may decrypt each line as it is read, using the key identified by the KeyID for that line. As shown at block 416, OS 70 may then also use those tags to write the content to the new page, one line at a time. For instance, if the tags are KeyIDs, memory protection module 34 may encrypt each line as it is written, using the key identified by the KeyID for that line. As shown at block 418, OS 70 may then update page table 64A to map the new physical page to one or more virtual pages of process 60A. As shown at block 420, OS 70 may then allow the write that was originally requested by process 60A to update the new page.

Some of the solutions or protections which software may implement using memory colors or memory tags according to the present disclosure include the following: physical corruption detection, out-of-bounds detection, use-after-free detection, heap coverage (with library support), stack coverage (with compiler support), inter-process/virtual machine (VM) corruption detection, and kernel/virtual machine monitor (VMM) corruption detection. As has been described, memory tags may be specified as parts of virtual memory addresses and/or physical memory addresses, and memory tags and/or other memory metadata may be stored in MTMs in RAM and/or in ECM or other sequestered memory.

Furthermore, as has been described, a data processing system may provide memory protection with subpage granularity. Furthermore, the data processing system may maintain memory protection with subpage granularity when handling operations such as SI/SO and COW.

Although certain example embodiments are described herein, one of ordinary skill in the art will understand that those example embodiments may easily be divided, combined, or otherwise altered to implement additional embodiments. Thus, the present teachings are not limited to the embodiments and/or scenarios described herein, but may be used to advantage in a wide variety of embodiment and scenarios. For instance, in another embodiment or scenario, a data processing system may be configured to launch a process with memory tag protection for all of the memory used by that process, and not just the dynamically allocated memory. In such an embodiment, the OS may assign a memory tag value to the initial block for the process before launching the process.

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, as described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices. Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, dynamic RAM, static RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered. Embodiments of technology for managing memory tags include the following examples:

Example A1 is a data processing system with support for sub-page granular memory tags. The data processing system comprises at least one core, a memory controller responsive to the core, RAM responsive to the memory controller, and a memory protection module in the memory controller. The memory protection module enables the memory controller to use a memory tag value supplied as part of a memory address to protect data stored at a location that is based on a location value supplied as another part of the memory address. The memory controller enables an OS in the data processing system to swap a page of data out of the RAM to NVS by using an MTM to apply memory tag values to respective subpages within the page being swapped out.

Example A2 is a data processing system according to Example A1, wherein the memory controller enables the OS to swap the page of data back into RAM by applying memory tag values to respective subpages within the page being swapped back in.

Example A3 is a data processing system according to Example A1, wherein the memory controller enables the OS to manages COW by (a) in response to a determination that COW has been triggered for a shared page of data in RAM, wherein the shared page is shared by a first process and a second process, using memory tag values associated with respective subpages within the shared page of data to copy the data to a new page in RAM; and (b) updating a page table for the first processes to map the new page to a virtual address space for the first process. Example A3 may also include the features of Example A2.

Example A4 is a data processing system according to Example A1, wherein the core is configured to automatically maintain a system MTM that identifies a proper memory tag value for each physical line of tagged memory that has been mapped to a virtual page. Example A4 may also include the features of any one or more of Examples A2-A3.

Example A5 is a data processing system according to Example A4, further comprising sequestered memory responsive to the memory controller, wherein the sequestered memory is not directly accessible to the OS. Also, the memory controller is configured to store the system MTM in the sequestered memory.

Example A6 is a data processing system according to Example A5, wherein the sequestered memory comprises ECC memory.

Example A7 is a data processing system according to Example 6, wherein the core supports a privileged read_memory_metadata instruction which, when executed, enables the core to obtain, from the system MTM in the sequestered memory, a memory tag value for a subpage in RAM, in response to supplying the read_memory_metadata instruction with the physical address of that subpage. Example A7 may also include the features of Example A6.

Example A8 is a data processing system according to Example 1, wherein the core supports a read_tagged_page instruction which, when executed, enables the core to (a) use memory tag values to read data from multiple subpages of tagged memory within a specified source page, and (b) copy the data to a specified destination page. Example A8 may also include the features of any one or more of Examples A2-A7.

Example A9 is a data processing system according to Example A8, wherein (a) the memory tag values comprise at least one KeyID, the operation of using memory tag values to read data from multiple subpages of tagged memory within the specified source page comprises using a key corresponding to the KeyID to decrypt the data, and the operation of copying the data to the specified destination page comprises copying the decrypted data to the specified destination page.

Example B1 is at least one non-transitory machine-accessible medium comprising computer instructions for supporting sub-page granular memory tags. The computer instructions, in response to being executed on a data processing system, enable the data processing system to (a) use a memory tag value supplied as part of a memory address to specify protection for data stored at a location within a page of data in RAM of the data processing system, wherein the location is based on a location value supplied as another part of the memory address, wherein the RAM is responsive to a memory controller in the data processing system, and wherein a memory protection module in the memory controller enables the memory controller to protect the data in RAM, based on the memory tag value; and (b) swap the page of data out of the RAM to NVS of the data processing system by using an MTM to apply memory tag values to respective subpages within the page being swapped out.

Example B2 is at least one machine-accessible medium according to Example B1, wherein the instructions, when executed, further enable the data processing system to swap the page of data back into RAM by applying memory tag values to respective subpages within the page being swapped back in.

Example B3 is at least one machine-accessible medium according to Example B1, wherein the instructions, when executed, further enable the data processing system to manage COW by (a) automatically determining whether COW has been triggered for a shared page of data in RAM, wherein the shared page is shared by a first process and a second process; (b) in response to determining that COW has been triggered for the shared page of data, using memory tag values associated with the shared page of data to copy the data to a new page; and (c) updating a page table for the first processes to map the new page to a virtual address space for the first process. Example B3 may also include the features of Example B2.

Example C1 is a method for managing sub-page granular memory tags in a data processing system. The method comprises (a) in connection with swapping a page of data out of RAM in the data processing system to NVS in the data processing system, using an MTM to apply memory tag values to respective subpages within the page being swapped out; and (b) in connection with swapping the page of data from NVS back in to RAM, applying memory tag values to respective subpages within the page being swapped back in to RAM.

Example C2 is a method according to Example C1, further comprising, when a process accesses a particular subpage within the page, (a) the process includes the memory tag value for that particular subpage as part of a virtual address for that particular subpage and (b) the process also includes a location value as part of the virtual address for that particular subpage.

Example C3 is a method according to Example C 1, wherein (a) at least one of the memory tag values comprises a tag value that was specified by an application running in a process on the data processing system, and (b) the operation of using the MTM to apply memory tag values to respective subpages within the page being swapped out is performed at least in part by an operating system running on the data processing system. Example C3 may also include the features of Example C2.

Example C4 is a method according to Example C1, further comprising (a) automatically determining whether COW has been triggered for a shared page of data in RAM, wherein the shared page is shared by a first process and a second process; (b) in response to determining that COW has been triggered for the shared page of data, using memory tag values associated with respective subpages within the shared page of data to copy the data to a new page in RAM; and (c) updating a page table for the first processes to map the new page to a virtual address space for the first process. Example C4 may also include the features of any one or more of Examples C2-C3.

Example C5 is a method according to Example C1, further comprising automatically maintaining a system MTM that identifies a proper memory tag value for each physical line of tagged memory that has been mapped to a virtual page. Example C5 may also include the features of any one or more of Examples C2-C4.

Example C6 is a method according to Example C5, wherein the system MTM is stored in the data processing system in sequestered memory responsive to the memory controller, wherein the sequestered memory is not directly accessible to an OS in the data processing system.

Example C7 is a method according to Example C5, further comprising using a privileged read_memory_metadata instruction to obtain, from the system MTM in the sequestered memory, a memory tag value for a subpage in RAM, in response to supplying the read_memory_metadata instruction with the physical address of that subpage. Example C7 may also include the features of Example C6.

Example C8 is a method according to Example C1, further comprising (a) using a read_tagged_page instruction to use memory tag values to read data from multiple subpages of tagged memory within a specified source page, and (b) using the data that was read from the source page to update a specified destination page. Example C8 may also include the features of any one or more of Examples C2-C7.

In view of the wide variety of useful permutations that may be readily derived from the example embodiments described herein, this detailed description is intended to be illustrative only, and should not be taken as limiting the scope of coverage.

What is claimed is:

1. A data processing system with support for sub-page granular memory tags, the data processing system comprising:
    at least one core that is configured to automatically maintain a memory tag map (MTM) that identifies a single memory tag value for each physical line of tagged memory that has been mapped to a virtual page by an operating system (OS) in the data processing system;
    a memory controller responsive to the core;
    random access memory (RAM) responsive to the memory controller; and
    a memory protection module in the memory controller;
    wherein the memory protection module enables the memory controller to use memory tag values supplied as parts of memory addresses to protect data stored at locations that are based on location values supplied as other parts of the memory addresses, wherein to use memory tag values to protect data comprises:
        (a) to use a first memory tag value to obtain a first key and (b) to use the first key to encrypt a first line for a page of data before storing the encrypted first line in the RAM; and
        (a) to use a second memory tag value to obtain a second key and (b) to use the second key encrypt a second line for the page of data before storing the encrypted second line in the RAM, wherein the first and second lines reside in one page of data;
    wherein the memory protection module enables an application to obtain a decrypted version of the encrypted first line by (a) including the first memory tag value as part of a virtual address for the first line, and (b) also including a first location value as part of the virtual address for the first line;
    wherein the memory protection module enables the application to obtain a decrypted version of the encrypted second line by (a) including the second memory tag value as part of a virtual address for the second line, and (b) also including a second location value as part of the virtual address for the second line; and
    wherein the memory controller enables the OS to swap the page of data out of the RAM to non-volatile storage (NVS) by:
        using the MTM to obtain memory tag values for lines within the page, the memory tag values to comprise the first and second memory tag values;
        (a) using the first memory tag value to obtain the first key, and (b) using the first key to decrypt the first line before storing the first line to the NVS; and
        (a) using the second memory tag value to obtain the second key, and (b) using the second key decrypt the second line before storing the second line to the NVS.

2. A data processing system according to claim 1, wherein the memory controller enables the OS to swap the page of data back into RAM by applying memory tag values to respective lines within the page being swapped back in.

3. A data processing system according to claim 1, wherein the memory controller enables the OS to manage copy-on-write (COW) by:
    in response to a determination that COW has been triggered for a shared page of data in RAM, wherein the shared page is shared by a first process and a second process, using memory tag values associated with respective lines within the shared page of data to copy the data to a new page in RAM; and
    updating a page table for the first processes to map the new page to a virtual address space for the first process.

4. A data processing system according to claim 1, further comprising:

sequestered memory responsive to the memory controller, wherein the sequestered memory is not directly accessible to the OS; and wherein the memory controller is configured to store the MTM in the sequestered memory.

5. A data processing system according to claim 4, wherein the sequestered memory comprises error-correcting code (ECC) memory.

6. A data processing system according to claim 4, wherein the core supports a privileged read_memory_metadata instruction which, when executed, enables the core to obtain, from the MTM in the sequestered memory, a memory tag value for a particular line in RAM, in response to supplying the read_memory_metadata instruction with the physical address of that particular line.

7. A data processing system according to claim 1, wherein the core supports a read_tagged_page instruction which, when executed, enables the core to:
use memory tag values to read data from multiple lines of tagged memory within a specified source page; and
copy that data to a specified destination page.

8. A data processing system according to claim 7, wherein:
the memory tag values comprise at least one key identifier (KeyID);
the operation of using memory tag values to read data from multiple lines of tagged memory within the specified source page comprises using a key corresponding to the KeyID to decrypt the data; and
the operation of copying that data to the specified destination page comprises copying the decrypted data to the specified destination page.

9. At least one non-transitory machine-accessible medium comprising computer instructions for supporting sub-page granular memory tags, wherein the computer instructions, in response to being executed on a data processing system, enable the data processing system to:
maintain a memory tag map (MTM) that identifies a single memory tag value for each physical line of tagged memory that has been mapped to a virtual page by an operating system (OS) in the data processing system;
use memory tag values supplied as parts of memory addresses to protect data stored at locations within a page of data in random access memory (RAM) of the data processing system, wherein the locations are based on location values supplied as other parts of the memory addresses, wherein the RAM is responsive to a memory controller in the data processing system, and wherein a memory protection module in the memory controller enables the memory controller to protect the data in RAM, based on the memory tag values, wherein to protect the data in RAM based on the memory tag values comprises:
(a) to use a first memory tag value to obtain a first key and (b) to use the first key to encrypt a first line for a page of data before storing the encrypted first line in the RAM; and
(a) to use a second memory tag value to obtain a second key and (b) to use the second key encrypt a second line for the page of data before storing the encrypted second line in the RAM, wherein the first and second lines reside in one page of data;
by an application, obtain a decrypted version of the encrypted first line by (a) including the first memory tag value as part of a virtual address for the first line, and (b) also including a first location value as part of the virtual address for the first line;
by the application, obtain a decrypted version of the encrypted second line by (a) including the second memory tag value as part of a virtual address for the second line, and (b) also including a second location value as part of the virtual address for the second line;
by the OS, swap the page of data out of the RAM to non-volatile storage (NVS) of the data processing system by:
using the MTM to obtain memory tag values for lines within the page, the memory tag values to comprise the first and second memory ta values;
(a) using the first memory tag value to obtain the first key, and (b) using the first key to decrypt the first line before storing the first line to the NVS; and
(a) using the second memory tag value to obtain the second key, and (b) using the second key decrypt the second line before storing the second line to the NVS.

10. At least one machine-accessible medium according to claim 9, wherein the instructions, when executed, further enable the data processing system to swap the page of data back into RAM by applying memory tag values to respective lines within the page being swapped back in.

11. At least one machine-accessible medium according to claim 9, wherein the instructions, when executed, further enable the data processing system to manage copy-on-write (COW) by:
automatically determining whether COW has been triggered for a shared page of data in RAM, wherein the shared page is shared by a first process and a second process;
in response to determining that COW has been triggered for the shared page of data, using memory tag values associated with the shared page of data to copy the data to a new page; and
updating a page table for the first processes to map the new page to a virtual address space for the first process.

12. At least one machine-accessible medium according to claim 9, wherein:
a first portion of the instructions, when executed by an operating system (OS), enable the OS to use the MTM to apply memory tag values to respective lines within the page being swapped out; and
a second portion of the instructions, when executed by an application running in a process on the data processing system, enable the application to specify at least one of the memory tag values.

13. At least one machine-accessible medium according to claim 9, wherein the instructions, when executed, further enable the data processing system to use a privileged read_memory_metadata instruction to obtain, from the MTM in the sequestered memory, a memory tag value for a line in RAM, in response to supplying the read_memory_metadata instruction with a physical address of that line.

14. A method for managing sub-page granular memory tags in a data processing system, the method comprising:
automatically maintaining a memory tag map (MTM) that identifies a single memory tag value for each physical line of tagged memory that has been mapped to a virtual page;
using memory tag values supplied as parts of memory addresses to protect data stored at locations within a page of data in random access memory (RAM) of the data processing system, wherein the locations are based on location values supplied as other parts of the memory addresses, wherein the RAM is responsive to a memory controller in the data processing system, and wherein a memory protection module in the memory controller enables the memory controller to protect the data in RAM, based on the memory tag values, wherein to protect the data in RAM based on the memory tag values comprises:
- (a) to use a first memory tag value to obtain a first key and (b) to use the first key to encrypt a first line for a page of data before storing the encrypted first line in the RAM; and
- (a) to use a second memory tag value to obtain a second key and (b) to use the second key encrypt a second line for the page of data before storing the encrypted second line in the RAM, wherein the first and second lines reside in one page of data;

obtaining a decrypted version of the encrypted first line by (a) including the first memory tag value as part of a virtual address for the first line, and (b) also including a first location value as part of the virtual address for the first line;

obtaining a decrypted version of the encrypted second line by (a) including the second memory tag value as part of a virtual address for the second line, and (b) also including a second location value as part of the virtual address for the second line; and swapping the page of data out of the RAM to non-volatile storage (NVS) of the data processing system by:
- using the MTM to obtain memory tag values for lines within the page, the memory tag values to comprise the first and second memory tag values;
- (a) using the first memory tag value to obtain the first key, and (b) using the first key to decrypt the first line before storing the first line to the NVS; and
- (a) using the second memory tag value to obtain the second key, and (b) using the second key decrypt the second line before storing the second line to the NVS.

15. A method according to claim 14, wherein:
the operations of (a) using the first memory tag value to obtain the first key and (b) using the first key to encrypt the first line before storing the encrypted first line in the RAM are performed by the memory protection module;
the operation of accessing the first line is performed, at least in part, by a first process in the data processing system; and
the operation of accessing the second line is performed, at least in part, by a second process in the data processing system.

16. A method according to claim 14, wherein:
at least one of the memory tag values comprises a tag value that was specified by an application running in a process on the data processing system; and
the operation of swapping the page of data out of the RAM to NVS is performed at least in part by an operating system running on the data processing system.

17. A method according to claim 14, further comprising:
automatically determining whether copy-on-write (COW) has been triggered for a shared page of data in RAM, wherein the shared page is shared by a first process in the data processing system and a second process in the data processing system;
in response to determining that COW has been triggered for the shared page of data, using memory tag values associated with respective lines within the shared page of data to copy the data to a new page in RAM; and
updating a page table for the first processes to map the new page to a virtual address space for the first process.

18. A method according to claim 14, wherein the MTM is stored in the data processing system in sequestered memory responsive to the memory controller, wherein the sequestered memory is not directly accessible to an operating system (OS) in the data processing system.

19. A method according to claim 18, further comprising:
using a privileged read_memory_metadata instruction to obtain, from the MTM in the sequestered memory, a memory tag value for a line in RAM, in response to supplying the read_memory_metadata instruction with a physical address of that line.

20. A method according to claim 14, further comprising:
using a read_tagged_page instruction to use memory tag values to read data from multiple lines of tagged memory within a specified source page; and
using the data that was read from the source page to update a specified destination page.

* * * * *